United States Patent [19]

Nambu et al.

[11] Patent Number: 5,344,880

[45] Date of Patent: Sep. 6, 1994

[54] THERMOSETTING COMPOSITION

[75] Inventors: Toshiro Nambu; Hirotoshi Kawaguchi; Hisao Furukawa; Yasushi Kato, all of Kobe, Japan

[73] Assignee: Kanegafuchi Kagaku Kogyo Kabushiki Kaisha, Osaka, Japan

[21] Appl. No.: 13,186

[22] Filed: Jan. 29, 1993

Related U.S. Application Data

[63] Continuation of Ser. No. 505,394, Apr. 6, 1990, abandoned.

[30] Foreign Application Priority Data

Apr. 6, 1989 [JP] Japan ..................... 1-87733

[51] Int. Cl.$^5$ ..................... C08L 83/06; C08L 83/10
[52] U.S. Cl. ..................... 525/100; 525/209; 528/16; 528/26
[58] Field of Search ............... 525/100, 209; 528/16, 528/26

[56] References Cited

U.S. PATENT DOCUMENTS 4,334,036  6/1982  Yonezawa et al. ............... 525/102
4,564,557  1/1986  Ohgushi et al. .................. 428/333

FOREIGN PATENT DOCUMENTS 063817  4/1982  European Pat. Off. .
57-36109  2/1982  Japan .
58-157810  9/1983  Japan .

*Primary Examiner*—Melvyn I. Marquis
*Assistant Examiner*—D. Aylward
*Attorney, Agent, or Firm*—Armstrong, Westerman, Hattori, McLeland & Naughton

[57] ABSTRACT

A composition including (A) a hydroxyl group-containing acrylic resin, (B) an acrylic copolymer containing an alkoxysilyl group having the formula (I):

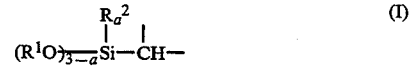

(C) a polyorganosiloxane and (D) a curing catalyst. The composition can give the film with excellent weatherability, stain resistance, acid resistance, water repellency and durability and with no bad-smelling odor.

14 Claims, No Drawings

THERMOSETTING COMPOSITION

This application is a continuation of application Ser. No. 07/505,394 filed Apr. 6, 1990 now abandoned.

BACKGROUND OF THE INVENTION

The present invention relates to a thermosetting composition, and more particularly to a thermosetting composition suitable for use as coatings for outer walls of buildings, automobiles, industrial equipments, steel furnitures, household electric appliances, plastics, and the like, especially coatings required to have excellent durability.

As to thermosetting coatings which have hitherto been used, a melamine resin such as an alkyd melamine resin, an acrylic melamine resin or an epoxy melamine resin is used as a crosslinking agent. Accordingly, there cannot be solved a problem that a bad-smelling odor caused by the melamine resin remains.

On the other hand, acrylic melamine resins or alkyd melamine resins which have been generally used as a coating for automobiles are unsatisfactory in film properties such as weatherability, stain resistance, acid resistance and water repellency, so it has been required to improve the film properties.

An object of the present invention is to provide a thermosetting composition whose bad-smelling odor is reduced and which can give films with excellent film properties.

This and the other objects of the present invention will become apparent from the following description hereinafter.

SUMMARY OF THE INVENTION

It has now been found that when a hydroxyl group-containing acrylic resin is combined with an alkoxysilyl group-containing acrylic polymer and a polyorganosiloxane, using no melamine resins, the obtained composition is improved in bad-smelling odor and film properties.

In accordance with the present invention, there is provided a thermosetting composition which is crosslinkable by the formation of a siloxy group or a siloxane bond; which is comprises
(A) a hydroxyl group-containing acrylic resin,
(B) an acrylic copolymer containing an alkoxysilyl group having the formula (I):

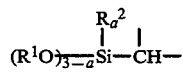

wherein $R^1$ is an alkyl group having 1 to 10 carbon atoms, $R^2$ is hydrogen atom, an alkyl group, an aryl group or an aralkyl group, and a is 0, 1 or 2,
(C) a polyorganosiloxane and
(D) a curing catalyst.

DETAILED DESCRIPTION

In the present invention, there is used an acrylic resin containing hydroxyl group and containing no alkoxysilyl group [acrylic resin containing hydroxyl group other than the alkoxysilyl group-containing acrylic copolymer (B)] as the component (A).

The hydroxyl group-containing acrylic resin (A) is excellent in weatherability, chemical resistance and water resistance since its main chain substantially consists of an acrylic copolymer chain. The hydroxyl group-containing acrylic resin (A) can be prepared, for instance, by copolymerizing a hydroxyl group-containing monomer (1) with an acrylic or methacrylic acid or a derivative therefrom (2).

The hydroxyl group-containing monomer (1) used in the present invention is not particularly limited. Typical examples of the hydroxyl group-containing monomers (1) are, for instance, an acrylic or methacrylic monomer containing hydroxyl group, e.g., 2-hydroxyethyl acrylate or methacrylate, 2-hydroxypropyl acrylate or methacrylate, "Placcel FA-1" [polycaprolactone containing acryloyl group at the side end and which has a number average molecular weight (hereinafter referred to as "Mn") of 230] (commercially available from Daicel Chemical Industries, Ltd.), "Placcel FA-4" (polycaprolactone containing acryloyl group at the side end and which has an Mn of 572), "Placcel FM-1" (polycaprolactone containing methacryloyl group at the side end and which has a Mn of 244), "Placcel FM-4" (polycaprolactone containing methacryloyl group at the side end and which has an Mn of 600), 2-hydroxyethyl vinyl ether, and the like. The hydroxyl group-containing monomer (1) may be used alone or as an admixture thereof.

The monomers (2) are not particularly limited. Typical Examples of the monomers (2) are, for instance, an acrylic or methacrylic monomer, e.g., acrylic acid, methacrylic acid, methyl acrylate or methacrylate, ethyl acrylate or methacrylate, butyl acrylate or methacrylate, 2-ethylhexyl acrylate or methacrylate, stearyl acrylate or methacrylate, benzyl acrylate or methacrylate, cyclohexyl acrylate or methacrylate, trifluoroethyl acrylate or methacrylate, pentafluoropropyl acrylate or methacrylate, perfluorocyclohexyl acrylate or methacrylate, acrylonitrile, methacrylonitrile, glycidyl acrylate or methacrylate, dimethylaminoethyl acrylate or methacrylate, diethylaminoethyl acrylate or methacrylate, acrylamide, methacrylamide, α-ethyl acrylamide or methacrylamide, N-butoxymethyl acrylamide or methacrylamide, N,N-dimethyl acrylamide, N-methyl acrylamide, acryloyl morpholine, N-methylol acrylamide or methacrylamide, "Aronix M-5700" (commercially available from Toagosei Chemical Industry Co., Ltd.), "AS-6", "AN-6", "AA-6", "AB-6", "AK-5", (which are macromers, commercially available from Toagosei Chemical Industry Co., Ltd,), a phosphate group-containing vinyl compound which is prepared by the condensation of hydroxyalkyl esters of α,β-ethylenically unsaturated carboxylic acid such as hydroxyalkyl esters of acrylic or methacrylic acid with phosphoric acid or phosphoric esters, an acrylate or methacrylate containing an urethane bond or siloxane bond, and the like.

The hydroxyl group-containing acrylic resin (A) may contain an urethane bond or siloxane bond, or monomers other than acrylic or methacrylic acid, or its derivatives in its main chain so long as the amount of the urethane or siloxane bond, or the other monomers in the resin (A) is less than 50 parts by weight based on 100 parts by weight of the resin (A). The monomers other than the acrylic or methacrylic monomer are not particularly limited. Typical examples of the monomers are, for instance, an aromatic hydrocarbon vinyl compound such as styrene, α-methylstyrene, chlorostyrene, styrenesulfonic acid or vinyl toluene; an unsaturated carboxylic acid such as maleic acid, fumaric acid or itaconic acid, its salt (alkali metal salt, ammonium salt, amine salt), its anhydride (maleic anhydride), a diester or half ester of the above unsaturated carboxylic acid or anhydride with an alcohol with 1 to 20 carbon atoms having a linear or branched chain; a vinyl ester such as vinyl acetate or vinyl propionate; an allyl compound such as diallyl phthalate; an amino group-containing vinyl compound such as vinylpyridine, aminoethyl vinyl ether; an amide group-containing vinyl compound such as itaconic acid diamide, crotonamide, maleic acid diamide, fumaric acid diamide, N-vinylpyrrolidone; an other vinyl compound such as methyl vinyl ether, cyclohexyl vinyl ether, vinyl chloride, vinylidene chloride, chloroprene, propylene, butadiene, isoprene, fluoroolefin, maleimide, N-vinylimidazole or vinylsulfonic acid; and the like.

It is preferable that the hydroxyl group-containing acrylic resin (A) is obtained by solution polymerization using an azo radical polymerization initiator such as azobisisobutyronitrile since the resin (A) can be easily obtained according to the above-mentioned method. In such a solution polymerization, if necessary, a chain transfer agent such as n-dodecyl mercaptane, t-dodecyl mercaptane of n-butyl mercaptane is used thereby controlling the molecular weight of the resin (A). Non-reactive solvents are used without particular limitations in the polymerization.

In the invention, a dispersion containing no water wherein particles of the hydroxyl group-containing acrylic resin (A) which is insoluble in an organic solvent are dispersed in the organic solvent can be used as the component (A).

The molecular weight and the hydroxyl value of the hydroxyl group-containing acrylic resin (A) are not particularly limited, and hydroxyl group-containing acrylic resins usually used can be used as the resin (A) in the present invention. It is preferable that the number average molecular weight of the acrylic resin (A) is from 1,500 to 40,000, more preferably from 3,000 to 25,000, from the view point of the viscosity of the coating composition and the properties of a film (a coating film prepared from the composition of the invention) such as durability. Also, it is preferable that the hydroxyl value of the acrylic resin (A) is from 10 to 300 mg/KOH, more preferably from 20 to 250 mg/KOH, from the viewpoint of the film properties such as strength and durability. The hydroxyl group-containing acrylic resin (A) may be used alone or as an admixture thereof.

The acrylic copolymer having an alkoxysilyl group (B) [the alkoxysilyl group-containing acrylic copolymer (B)] is a polymer having at the molecular ends or side chains at least one, preferably two or more alkoxysilyl group having the formula (I):

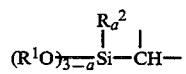
(I)

wherein $R^1$ is an alkyl group having 1 to 10 carbon atoms, $R^2$ is hydrogen atom, an alkyl group, an aryl group or an aralkyl group, $a$ is 0, 1 or 2. As the alkyl, aryl or aralkyl group in the group $R^2$, an alkyl, aryl or aralkyl group having 1 to 10 carbon atoms is preferable. Since the main chain of the acrylic copolymer (B) substantially consists of an acrylic copolymer chain, the acrylic copolymer (B) is excellent in weatherability, chemical resistance, water resistance, and the like. Further, since the alkoxysilyl group is attached to the carbon atom, the acrylic copolymer (B) is more excellent in water resistance, alkali resistance, acid resistance, and the like. As the group (I), a group having the formula:

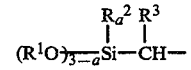

wherein $R^3$ is hydrogen atom, an alkyl group, an aryl group or an aralkyl group and $R^1$, $R^2$ and $a$ are as defined above is preferable. As the alkyl, aryl or aralkyl group in the group $R^3$, an alkyl, aryl or aralkyl group having 1 to 10 carbon atoms is preferable. The alkoxysilyl group in the acrylic copolymer (B) reacts with the hydroxyl group in the acrylic resin (A) to crosslink, and the alkoxysilyl groups react with each other to crosslink. When the number of the alkoxysilyl group in the acrylic copolymer (B) is less than one in one molecule, the solvent resistance of the obtained film becomes poor. It is preferable that the number average molecular weight of the acrylic copolymer (B) is from 1,000 to 30,000, more preferably from 3,000 to 25,000, from the viewpoint of the film properties such as strength and durability.

The alkoxysilyl group-containing acrylic copolymer (B) can be prepared, for instance, by copolymerizing acrylic or methacrylic acid, or a derivative therefrom (3) with a monomer containing the alkoxysilyl group (4).

The monomers (3) are not particularly limited. Typical examples of the monomers (3) are, for instance, an acrylic or methacrylic monomer, i.e., acrylic acid, methacrylic acid, methyl acrylate or methacrylate, ethyl acrylate or methacrylate, butyl acrylate or methacrylate, 2-ethylhexyl acrylate or methacrylate, stearyl acrylate or methacrylate, benzyl acrylate or methacrylate, cyclohexyl acrylate or methacrylate, trifluoroethyl acrylate or methacrylate, pentafluoropropyl acrylate or methacrylate, perfluorocyclohexyl acrylate or methacrylate, acrylonitrile, methacrylonitrile, glycidyl acrylate or methacrylate, dimethylaminoethyl acrylate or methacrylate, diethylaminoethyl acrylate or methacrylate, acrylamide, methacrylamide, α-ethyl acrylamide or methacrylamide, N-butoxymethyl acrylamide or methacrylamide, N,N-dimethyl acrylamide, N-methyl acrylamide, acryloyl morpholine, 2-hydroxyethyl acrylate or methacrylate, 2-hydroxypropyl acrylate or methacrylate, N-methylol acrylamide or methacrylamide, "Aronix M-5700", "AS-6", "AN-6", "AA-6", "AB-6", "AK-5", "Placcel FA-1", "Placcel FA-4", "Placcel FM-1", "Placcel FM-4", a phosphate group-containing vinyl compound which is prepared by the condensation of hydroxyalkyl esters of α,β-ethylenically unsaturated carboxylic acid such as hydroxyalkyl esters of acrylic or methacrylic acid with phosphoric acid or phosphoric esters, an acrylate or methacrylate containing an urethane bond or siloxane bond, and the like.

The alkoxysilyl group-containing acrylic copolymer (B) may contain an urethane bond or siloxane bond, or monomers other than the acrylic or methacrylic acid, or its derivative in its main chain so long as the amount of the urethane or siloxane bond, or the other monomers in the copolymer (B) is less than 50 parts by weight based on 100 parts by weight of the copolymer (B). The monomers other than acrylic or methacrylic monomers are not particularly limited. Typical examples of the other monomers are, for instance, an aromatic hydrocarbon vinyl compound such as styrene, α-methylstyrene, chlorostyrene, styrenesulfonic acid, 4-hydroxystyrene or vinyl toluene; an unsaturated carboxylic acid such as maleic acid, fumaric acid or itaconic acid, its salt (alkali metal salt, ammonium salt, amine salt), its anhydride (maleic anhydride), a diester or half ester of the above unsaturated carboxylic acid or anhydride with an alcohol with 1 to 20 carbon atoms having a linear or branched chain; a vinyl ester such as vinyl acetate or vinyl propionate; an allyl compound such as diallyl phthalate; an amino group-containing vinyl compound such as vinylpyridine, aminoethyl vinyl ether; an amide group-containing vinyl compound such as itaconic acid diamide, crotonamide, maleic acid diamide, fumaric acid diamide, N-vinylpyrrolidone; an other vinyl compound such as methyl vinyl ether, 2-hydroxyethyl vinyl ether, cyclohexyl vinyl ether, vinyl chloride, vinylidene chloride, chloroprene, propylene, butadiene, isoprene, fluoroolefin, maleimide, N-vinylimidazole or vinylsulfonic acid; and the like.

The alkoxysilyl group-containing monomers (4) are not particularly limited so long as the monomer has the alkoxysilyl group. Typical examples of the alkoxysilyl group-containing mononers (4) are, for instance, alkoxysilyl group-containing vinyl monomers having a polymerizable double bond such as

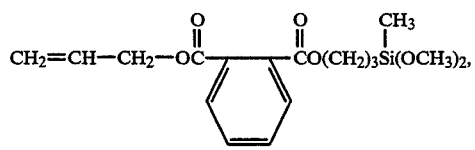

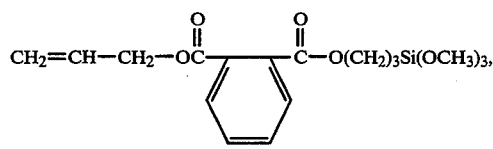

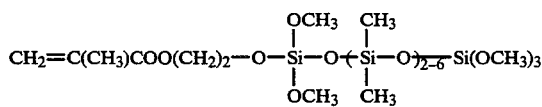

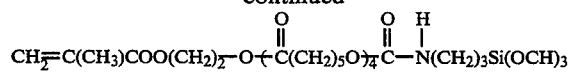

an acrylate or methacrylate having the alkoxysilyl group through an urethane bond or a siloxane bond at the molecular ends, and the like. The monomer (4) may be used alone or as an admixture thereof.

It is preferable that the alkoxysilyl group-containing copolymer (B) has 5 to 90% by weight, more preferably from 11 to 77% by weight, of units of the alkoxysilyl group-containing monomer (4).

The alkoxysilyl group-containing acrylic copolymer (B) can be prepared, for instance, in a manner as described in Japanese Unexamined Patent Publications No. 36395/1979, No. 36109/1982, No. 157810/1983, and the like. Especially, solution polymerizations using an azo radical polymerization initiator such as azobisisobutyronitrile are most preferable.

If necessary, in the above solution polymerization, there may be used a chain transfer agent for controlling the molecular weight of the alkoxysilyl group-containing acrylic copolymer (B). Examples of the chain transfer agents are, for instance, n-dodecyl mercaptan, t-dodecyl mercaptan, n-butyl mercaptan, γ-mercaptopropyltrimethoxysilane, γ-mercaptopropyltriethoxysilane, γ-mercaptopropylmethyldimethoxysilane, γ-mercaptopropylmethyldiethoxysilane, $(CH_3O)_3Si$—$S$—$S$—$Si$—$(OCH_3)_3$, $(CH_3O)_3Si$—$S_8$—$Si(OCH_3)_3$, and the like. Particularly, when using the chain transfer agent having the alkoxysilyl group in its molecule, such as γ-mercaptopropyltrimethoxysilane, it is possible to introduce the alkoxysilyl group into the alkoxysilyl group-containing acrylic copolymer (B) at the polymer end.

Non-reactive solvents are used in the above-mentioned copolymerization without particular limitations. Examples of the non-reactive solvents are, for instance, hydrocarbons such as toluene, xylene, n-hexane and cyclohexane, acetic esters such as ethyl acetate and butyl acetate, alcohols such as methanol, ethanol, isopropanol and n-butanol, ethers such as ethyl cellosolve, butyl cellosolve and cellosolve acetate, ketones such as methyl ethyl ketone, ethyl acetoacetate, acetylacetone, diacetone alcohol, methyl isobutyl ketone and acetone, and the like.

The alkoxysilyl group-containing acrylic copolymer (B) may be used alone or as an admixture thereof.

The amount of the alkoxysilyl group-containing acrylic copolymer (B) is not particularly limited. It is preferable that the weight ratio of the component (A) to the compound (B) is from 9/1 to 1/9, more preferably from 8/2 to 2/8. When the weight ratio of (A)/(B) is more than 9/1, the water resistance of the obtained film is lowered, and on the other hand, when the weight ratio of (A)/(B) is less than 1/9, the effects for improving the film properties such as appearance and hardness, obtained from the use of the component (A) are unsatisfactorily exhibited.

In the present invention, the polyorganosiloxane (C) is used for giving the water repellency to the film whereby the film can repel water for a long period of time, (for instance, the film can well repel water after a weathering test), and for preventing the film from the adhesion of a pollutant. Any polyorganosiloxane can be used without any limitation so long as it has a reactive functional group and it is compatible with the hydroxyl group-containing acrylic resin (A) and the alkoxysilyl group-containing acrylic copolymer (B). The structure of the polyorganosiloxane (C) can be in any state such as linear state, a branched stated, a network or a circular state. Examples of the organo group in the component (C) are, for instance, hydrogen atom, an alkyl group such as methyl group, ethyl group, propyl group, butyl group or hexyl group, an alkenyl group such as vinyl group, an allyl group, an aryl group such as phenyl group, and the like. Among them, methyl group, vinyl group and phenyl group are practically preferable because of a cheap cost.

Examples of the reactive functional group are, for instance, silanol group, an alkoxysilyl group, an alcoholic hydroxyl group, glycidyl group, amino group, mercapto group, carboxyl group, amide group, vinyl group, acryloyloxy group, methacryloyloxy group, and the like. Among them, the silanol group, the alkoxysilyl group and the alcoholic hydroxyl group:

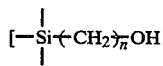

wherein n is an integer of 1 to 3 are preferable. It is preferable that the polyorganosiloxane (C) has one or more reactive functional group per molecule.

The molecular weight of the polyorganosiloxane (C) can be suitably decided, so long as the polyorganosiloxane can be compatible with the compounds (A) and (B). The compatibility of the component (C) with the components (A) and (B) lowers with the increase of the molecular weight of the component (C). So, there is preferably used a polyorganosiloxane (C) having 2 to 100 silicon atoms, more preferably from 3 to 50 silicon atoms.

Examples of the polyorganosiloxane (C) are, for instance, a silicone rubber, a silicone varnish, a silicone intermediate used for modifying an organic polymer, a reactive polydimethylsiloxane used as a reactive silicone oil, a reactive polydiphenylsiloxane, a reactive polymethylphenylsiloxane prepared by the copolymerization of dimethyldichlorosilane and diphenyldichlorosilane,

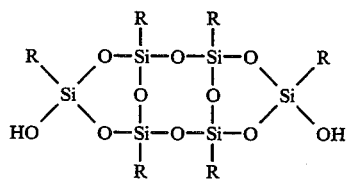

wherein R is a group selected from phenyl group, a $C_1$ to $C_4$ alkyl group and hydroxyl group

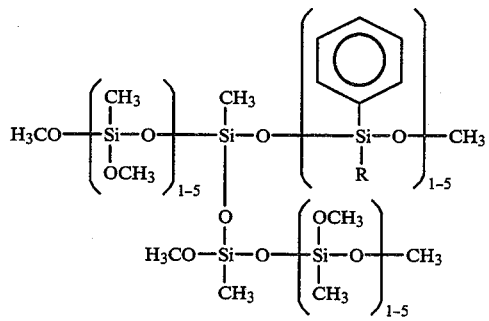

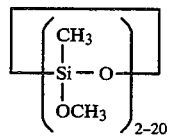

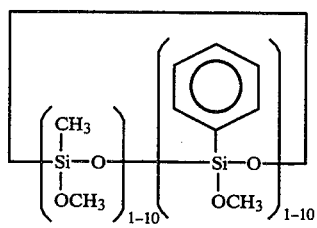

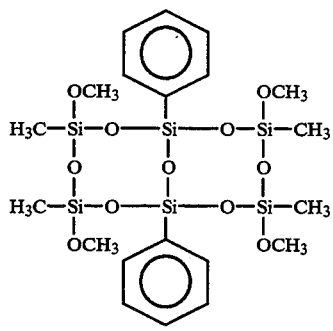

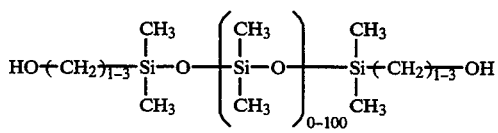

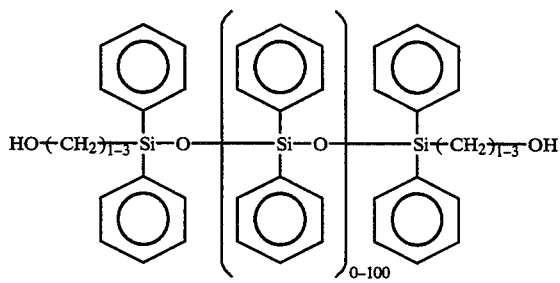

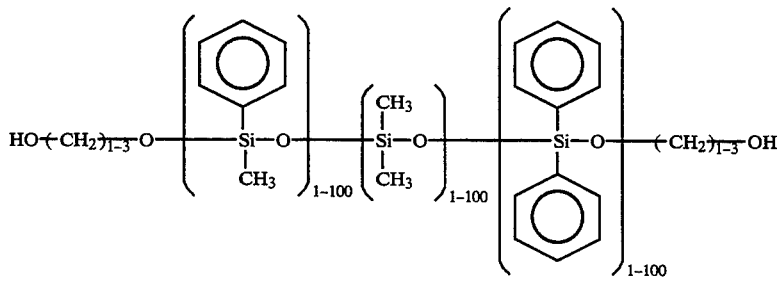

The polyorganosiloxane (C) may be used alone or as an admixture thereof.

The amount of the polyorganosiloxane (C) is usually from 0.01 to 100 parts by weight, preferably from 0.1 to 50 parts by weight, based on 100 parts by weight of the components (A) and (B) (solid matter). When the amount of the polyorganosiloxane (C) is less than 0.01 part by weight, the film is not given the water repellency. On the other hand, when the amount is more than 50 parts by weight, the compatibility is lowered and the cratering problem arises.

Examples of the curing catalyst -(D) used in the present invention are, for instance, an organotin compound, a phosphoric acid or phosphoric ester including an acid phosphate, an addition reaction product of a phosphoric acid and or an acid phosphate with an epoxy compound, an organic titanate compound, an organic aluminum compound, an acidic compound including a saturated or unsaturated polyvalent carboxylic acid or its anhydride, amines, a reaction product or a mixture of the amine as mentioned above with the acid phosphate, an alkaline compound, a reactive silicon compound, and the like.

Concrete examples of the organotin compounds are, for instance, dibutyl tin dilaurate, dibutyl tin dimaleate, dioctyl tin dilaurate, dioctyl tin dimaleate, tin octoate, and the like. Concrete examples of the phosphate are, for instance, monomethyl phosphate, monoethyl phosphate, monobutyl phosphate, monooctyl phosphate, monodecyl phosphate, dimethyl phosphate, diethyl phosphate, dibutyl phosphate, dioctyl phosphate, didecyl phosphate, and the like. As to the addition reaction product of the phosphoric acid and/or monomeric acid phosphate with the epoxy compound, concrete examples of the epoxy compounds are, for instance, propylene oxide, butylene oxide, cyclohexene oxide, glycidyl methacrylate, glycidol, allyl glycidyl ether, γ-glycidoxypropyltrimethoxysilane, γ-glycidoxypropyltriethoxysilane, γ-glycidoxypropylmethyldimethoxysilane,

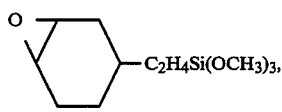

"Cardula E" (commercially available from Yuka Schell Kabushiki Kaisha), "Epicote 828" (epoxy resin) (commercially available from Yuka Shell Kabushiki Kaisha) or "Epicote 1001", and the like. Concrete examples of the acid anhydride are, for instance, maleic anhydride, and the like. Concrete examples of the acidic compound are, for instance, maleic acid, p-toluenesulfonic acid, and the like. Concrete examples of the amines are, for instance, hexylamine, di-2-ethylhexylamine, N,N-dimethyldodecylamine, dodecylamine, and the like. Concrete examples of the alkaline compounds are, for instance, sodium hydroxide, potassium hydroxide, and the like.

Among these catalysts (D), the organotin compound, the acid phosphate, the reaction product of the acid phosphate and the amine, the saturated or unsaturated polyvalent carboxylic acid or its anhydride, the reactive silicon compound, the organic titanate compound and the organic aluminum compound, and a mixture thereof are preferable, since these compounds have high activity.

The amount of the curing catalyst (D) is not particularly limited. The amount is usually from 0.1 to 20 parts by weight, preferably from 0.1 to 10 parts by weight, based on 100 parts by weight of the components (A) and (B) (solid matter). When the amount of the component (D) is less than 0.1 part by weight, the curability tends to lower. On the other hand, when the amount of the component (D) is more than 20 parts by weight, the appearance of the film tends to bad.

In the composition of the present invention, a dehydrating agent may be used or not. By using the dehydrating agent, the stability of the composition can be maintained for a long period of time, or even if using the composition repeatedly, the stability can be maintained. Examples of the dehydrating agents are, for instance, hydrolyzable ester compounds such as methyl orthoformate, ethyl orthoformate, methyl orthoacetate, ethyl orthoacetate, methyltrimethoxysilane, γ-methacryloyloxypropyltrimethoxysilane, vinyltrimethoxysilane, methyl silicate and ethyl silicate, and the like. The dehydrating agents may be added before, after or during the polymerization of the alkoxysilyl group-containing acrylic copolymer (B).

The amount of the dehydrating agent is not particularly limited. The amount is usually not more than 100 parts by weight, preferably not more than 50 parts by weight, based on 100 parts by weight of the components (A) and (B) (solid matter).

Further, it is possible to increase the effect of the dehydrating agent by the combination of a dehydrating accelerator with the dehydrating agent. Examples of the dehydrating accelerator used effectively are, for instance, inorganic acid such as hydrochloric acid, sulfuric acid, phosphoric acid or nitric acid; an organic acid such as formic acid, acetic acid, oxalic acid, benzoic acid, phtharic acid, p-toluenesulfonic acid, acrylic acid and methacrylic acid; a metal salt of carboxylic acid such as an alkyl titanate or lead octylate; an organotin compound, e.g., a carboxylic acid organotin compound such as tin acytlate, dibutyl tin dilaurate, or dioctyl tin maleate, a sulfide or mecapto organotin compound such as monobutyl tin sulfide or dioctyl tin mercaptide, an organotin oxide such as dioctyl tin oxide, an organotin compound obtained by the reaction of the organotin oxide and an ester compound such as ethyl silicate, "Ethyl Silicate 40", dimethyl maleate or dioctyl phthalate, an amine such as tetraethylenepentamine, triethylenediamine or N-β-aminoethyl-γ-aminopropyltrimethyoxysilane; an alkali compound such as potassium hydroxide or sodium hydroxide; and the like. Among them, the organic acids, the inorganic acids and the organotin compounds are particularly effective.

The amount of the dehydrating accelerator is from 0.0001 to 20 parts by weight, preferably from 0.001 to 10 parts by weight, based on 100 parts by weight of the dehydrating agent.

The organotin compounds, the amines and the alkali compounds also serve as the curing catalyst (D), as mentioned above. When using the compounds used as the component (D) as the dehydrating accelerator, the amount of the compounds is 0.1 to 20 parts by weight, preferably from 0.1 to 10 parts by weight based on 100 parts by weight of the components (A) and (B).

The composition of the invention may include a solvent, and any non-reactive solvent which is generally used in usual paints and coating agents can be used. Examples of the solvents are, for instance, aliphatic hydrocarbons, aromatic hydrocarbons, halogenated hydrocarbons, alcohols, ketones, esters, ethers, alcoholic esters, ketone alcohols, ether alcohols, ketone ethers, ketone esters, ester ethers, and the like. Among them, solvents containg alkyl alcohols are preferable from the view point of the increase of the stability of the composition of the invention.

Alkyl alcohols having an alkyl group with 1 to 10 carbon atoms are preferable as the alkyl alcohol. Examples of the preferable alcohols are, for instance, methyl alcohol, ethyl alcohol, n-propyl alcohol, isopropyl alcohol, n-butyl alcohol, isobutyl alcohol, sec-butyl alcohol, tert-butyl alcohol, n-amyl alcohol, isoamyl alcohol, hexyl alcohol, octyl alcohol, cellosolve, and the like. The amount of the alcohol is not particularly limited. Usually, the amount of the alcohol is not more than 100 parts by weight, preferably not more than 50 parts by weight, based on 100 parts by weight of the components (A) and (B) (solid matter). When using the combination of the alcohol and the dehydrating agent, the storage stability of the composition comprising the components (A), (B), (C) and (D) can be remarkably improved.

The amount of the solvent varies depending on the molecular weight of the components (A) and (B) or the composition of (A) and (B), and it is adjusted to a solid content or a viscosity of the coating composition practically used.

In order to improve the film properties such as adhesion, hardness and solvent resistance, silane compounds, their condensation products, their reaction products or mixtures thereof may be added to the composition of the present invention.

Examples of the silane compounds are, for instance, methyl silicate, methyltrimethoxysilane, ethyltrimethoxysilane, butyltrimethoxysilane, octyltrimethoxysilane, dodecyltrimethoxysilane, phenyltrimethoxysilane, vinyltrimethoxysilane, γ-methacryloyloxypropyltrimethyoxysilane, γ-acryloyloxypropyltrimethoxylilane, γ-glycidoxypropyltrimethoxysilane, γ-mercaptopropyltrimethoxysilane, γ-aminopropyltrimethoxysilane, N-β-aminoethyl-γ-propyltrimethoxysilane, dimethyldimethoxysilane, diethyldimethoxysilane, dibutyldimethoxysilane, diphenyldimethoxysilane, vinylmethyldimethoxysilane, γ-methacryloyloxypropylmethyldimethoxysilane, trimethylmethoxysilane, triethylmethoxysilane, triphenylmethoxysilane, ethyl silicate, methyltriethoxysilane, ethytriethoxysilane, butyltriethoxysilane, octyltriethoxysilane, dodecyltriethoxysilane, phenyltriethoxysilane, vinyltriethoxysilane, γ-methacryloyloxypropyltriethoxysilane, γ-acryloyloxypropyltriethoxysilane, γ-glycidoxypropyltriethoxysilane, γ-mercaptopropyltriethoxysilane, γ-aminopropyltriethoxysilane, N-β-aminoethyl-γ-propyltriethoxysilane, dimethyldiethoxysilane, diethyldiethoxysilane, dibutyldiethoxysilane, diphenyldiethoxysilane, vinylmethyldiethoxysilane, γ-methacryloyloxypropylmethyldiethoxysilane, trimethylethoxysilane, triethylethoxysilane, triphenylmethoxysilane, and the like.

The condensation product of the silane compound prepared by partially hydrolyzing the silane compound and condensing can be easily produced by mixing one or more silane compounds as mentioned above with a necessary amount of water, and, if necessary, a small amount of a condensation catalyst such as hydrochloric acid or sulfuric acid, and partially hydrolyzing and condensing the silane compound at room temperature to 100° C. while removing the produced alcohol from the reaction mixture. Examples of a silane compound having methoxysilyl group, prepared by partially hydrolyzing methyl silicate and condensing it are, for instance, "Methyl Silicate 47" commercially available from COLCOAT CO., Ltd., "Methyl Silicate 51", "Methyl Silicate 55", "Methyl Silicate 58", "Methyl Silicate 60", and the like.

Examples a silane compound having methoxysilyl group, prepared by partially hydrolyzing methyltrimethoxysilane or dimethyldimethoxysilane and condensing it are, for instance, "AFP-1" (commercially available from Shin-Etsu Chemical Co., Ltd.), "AFP-2", "AFP-6", "KR213" (commercially available from Shin-Etsu Chemical Co., Ltd.), "KR217", "KR9218", "TSR165" (commercially available from Toshiba Silicone Co., Ltd.), "TR3357", "Y-1587" (commercially available from Nippon Unicar Kabushiki Kaisha), "FZ-3701", "FZ-3704", and the like. Examples of a silane compound having ethoxysilyl group, prepared by partially hydrolyzing ethyl silicate and condensing it are, for instance, "Ethyl Silicate 40" "HAS-1" (commercially available from COLCOAT CO., Ltd.) "HAS-6", "HAS-10", and the like.

Examples of the reaction product of the abovementioned silane compound are, for instance, a reaction product by a silane coupling agent containing amino group with a silane coupling agent containing epoxy group; a reaction product of a silane coupling agent containing amino group with a compound containing epoxy group such as ethylene oxide, butylene oxide, epichlorohydrine, epoxidated soybean oil, "Epicoat 828" (commercially available from Yuka Shell Epoxy Kabushiki Kaisha) or "Epicoat 1001"; a reaction product of a silane coupling agent containing epoxy group with an amine, for instance, an aliphatic amine such as ethyl amine, diethyl amine, triethyl amine, ethylene diamine, hexane diamine, diethylene triamine, triethylene tetramine or tetraethylene pentamine, an aromatic amine such as aniline or diphenyl amine, an alicyclic amine such as cyclopentyl amine or cyclohexyl amine; and the like.

The amount of the silane compounds, their condensate, their reaction products, or their mixture is not particularly limited. Generally, the amount is from not more than 100 parts by weight, preferably not more than 50 parts by weight, based on 100 parts by weight of the components (A) and (B) (solid matter).

The composition of the present invention may contain an ultraviolet absorber or a light stabilizer in order to improve weatherability.

Any known ultraviolet absorbers can be used in the present invention. Examples of the ultraviolet absorber are, for instance, benzophenone, triazol, phenyl salicylate, diphenyl acrylate, and acetophenone ultraviolet absorbers, and the like.

Any known light stabilizer can be used in the present invention. Examples of the light stabilizer are, for instance, bis(2,2,6,6-tetramethyl-4-piperidyl)sebacate, bis(1,2,2,6,6-pentamethyl-4-piperidyl)sebacate, 2-(3,5-di-tert-butyl-4-hydroxylbenzyl)-2-n-butyl maloic acid, bis(1,2,2,6-pentamethyl-4-piperidyl), tetraxis(2,2,6,6-tetramethyl-4-piperidyl)-1,2,3,4-butane-tetracarboxylate, tetraxis(1,2,2,6,6-pentamethyl-4-piperidyl)-1,2,3,4-butanetertacarboxylate, and the like. They may be used alone or as an admixture thereof.

The weatherability of the composition of the present invention can be further improved by using the ultraviolet absorber and the light stabilizer.

The amount of the ultraviolet absorber is generally from 0.1 to 10 parts by weight, preferably from 1 to 5 parts by weight, based on 100 parts by weight of the components (A) and (B) (solid matter). Also, the amount of the light stabilizer is generally from 0.1 to 10 parts by weight, preferably from 1 to 5 parts by weight, based on 100 parts by weight of the components (A) and (B) (solid matter).

In the composition of the present invention, there can be added according to the uses thereof various additives such as diluents, pigments including an extender pigment, agents for preventing precipitation and leveling agents; celluloses such as nitrocellulose and cellulose acetate butyrate, resins such as epoxy resins, melamine resins, vinyl chloride resins, chlorinated propylene resins, chlorinated rubbers and polyvinyl butyral, fillers, and the like.

The preparation method of the composition of the present invention is not particularly limited. For instance, the component (A) is merely blended, so-called cold-blended, with the component (B), or the component (A) and (B) are hot-blended, for instance, the components (A) and (B) are mixed and the mixture partially made to react by heating, and the components (C) and (D) are added thereto.

The curing mechanism concerning the composition of the present invention is that the hydroxyl group of the hydroxyl group-containing acrylic resin (A) reacts with the alkoxysilyl group of the alkoxysilyl group-containing acrylic copolymer (B) to crosslink. Accordingly, the technique of the invention is quite different from conventional techniques using a melamine as the crosslinking agent.

The thermosetting composition of the present invention is suitable for use of coatings, modifier for plastics, adhesives, sealants, and the like. When using the composition as the coating, the obtained film is excellent in weatherability, adhesion, hardness and durability.

When using the composition as the coating, it is applied to a substrate according to a usual manner such as dipping manner, spraying or brushing, and the coated film can be cured at a temperature of not less than 30° C., preferably from 55° to 350° C.

The present invention is more specifically described and explained by means of the following Examples in which all % and part are by weight unless otherwise noted. It is to be understood that the present invention

REFERENCE EXAMPLE 1

[Preparation of an alkoxysilyl group-containing acrylic copolymer (B)]

A reactor equipped with a stirrer, a thermometer, a condenser, a nitrogen inlet tube and a dropping funnel was charged with 45.9 parts of xylene, and the reactor was heated to 110° C., introducing nitrogen gas thereto. A mixture (b) as shown below was added dropwise to the reactor at a uniform velocity through the dropping funnel for 5 hours.

| Mixture (a) | |
| --- | --- |
| Styrene | 12.8 parts |
| Methyl methacrylate | 50.1 parts |
| Stearyl methacrylate | 6.9 parts |
| γ-Methacryloyloxypropyltrimethoxysilane | 30.2 parts |
| Xylene | 13.5 parts |
| 2,2'-Azobisisobutyronitrile | 4.5 parts |

After completing the addition of the mixture (b), 0.5 part of 2,2'-azobisisobutyronitrile and 5 parts of toluene were added dropwise to the reactor at a uniform velocity for 1 hour. After completing the addition, the resulting mixture was aged at 110° C. for 2 hours, then the mixture was cooled down and it was diluted with xylene to give a resin solution (b) having a solid concentration of 60%. The properties of the resin are shown in Table 1.

REFERENCE EXAMPLE 2

[Preparation of a hydroxyl group-containing acrylic resin (A)]

The same reactor used as in Reference Example 1 was charged with 31.3 parts of butyl acetate and 9.5 parts of xylene and the reactor was heated to 110° C., introducing nitrogen gas thereto. A mixture (a-1) as shown below was added to the reactor in the same manner as in Reference Example 1.

| Mixture (a-1) | |
| --- | --- |
| Xylene | 18 parts |
| Styrene | 28.3 parts |
| Methyl methacrylate | 7.1 parts |
| n-Butyl acrylate | 32.5 parts |
| Methacrylic acid | 0.3 part |
| Placcel FM-1* | 31.8 parts |
| 2,2'-Azobisisobutyronitrile | 1.8 parts |

(*: addition reaction product of 2-hydroxyethyl methacrylate and ε-caprolactone, molar ratio = 1:1)

After completing the addition of the mixture (a-1), 0.2 part of 2,2'-azobisisobutyronitrile and 3.8 parts of toluene were added dropwise to the reactor at a uniform velocity for 1 hour. After completing the addition, the resulting mixture was aged at 110° C. for 2 hours, then the mixture was cooled down, and it was diluted with xylene to give a resin solution (a-1) having a solid concentration of 60%. The properties of the resin are shown in Table 1.

REFERENCE EXAMPLE 3

[Preparation of a hydroxyl group-containing acrylic resin (A)]

The same reactor as used in Reference Example 1 was charged with 31.3 parts of butyl acetate and 9.5 parts of xylene and the reactor was heated to 110° C., introducing nitrogen gas thereto. A mixture (a-2) as shown below was added to the reactor in the same manner as in Reference Example 1.

| Mixture (a-2) | |
| --- | --- |
| Xylene | 18 parts |
| Styrene | 14 parts |
| Methyl methacrylate | 7 parts |
| n-Butyl acrylate | 26 parts |
| Methacrylic acid | 0.3 part |
| Placcel FM-1 | 39.7 parts |
| 2-Hydroxyethyl methacrylate | 13 parts |

After completing the addition of the mixture (d), 0.2 part of 2,2'-azobisisobutyronitrile and 3.8 parts of toluene were added dropwise to the reactor at a uniform velocity for 1 hour. After completing the addition, the resulting mixture was aged at 110° C. for 2 hours, then the mixture was cooled down, and it was diluted with xylene to give a resin solution (a-2) having a solid concentration of 60%. The properties of the resin are shown in Table 1.

TABLE 1

| Resin solution | b | a-1 | a-2 |
| --- | --- | --- | --- |
| Non-volatile matter (%) | 60 | 60 | 60 |
| Viscosity (23° C., cps) | 900 | 4,400 | 5,100 |
| Acid value (mgKOH/g solid) | 0 | 2.0 | 2.0 |
| Hydroxyl value (mgKOH/g solid) | 0 | 73 | 148 |
| Number average molecular weight | 6,000 | 10,000 | 10,000 |
| Color number (Gardner) | <1 | <1 | <1 |
| The number of the alkoxysilyl groups in one molecule | 5.4 | — | — |

EXAMPLES 1–6 AND COMPARATIVE EXAMPLES 1–3

[Preparation of a white enamel (II)]

A paint shaker was charged with 48 g of the resin solution (b), 72 g of the resin solution (a-1), 48 g of "Titanium white CR 93" (titanium dioxide commercially available from Ishihara Industry Kabushiki Kaisha), 3.6 g of methyl orthoacetate, 10 g of isopropyl alcohol, 18.4 g of oxylene, 1.44 g of an agent for improving a film properties [reaction product of "A 1100" (aminosilane commercially available from UCC (Union Carbide Corp.)] and "A 187" (epoxysilane commercially available from UCC), 0.72 g of "TINUVIN 900" (benzotriazol ultraviolet absorber commercially available from Ciba-Geigy AG.) 0.72 g of "TINUVIN 144" (hindered amine light stabilizer), and 80 g of glass beads having a particle size of 2 mm φ, and the mixture was kneaded for 1 hour to give a white enamel (I).

[Preparation of a white enemel (II)]

The procedure of the preparation of white enemel (I) was repeated except that the resin solution (a-2) was used instead of the resin solution (a-1) to give a white enamel (II).

The obtained white enamel (I) or (II), a polyorganosiloxane and a curing catalyst are mixed in amounts as shown in Table 2, and the mixture was diluted with a mixed solvent of xylene and butanol (xylene/butanol=70:30 by weight) to give a coating composition with a viscosity suitable for coating.

A non-treated steal plate was sanded with a No. 240 water-proof abrasive paper and was degreased with xylene. The coating composition was air-sprayed on the treated steel plate, the sprayed plate was allowed to stand for 20 minutes and was baked at 140° C. for 30 minutes to give a film with a thickness of 30 μm.

As to the obtained film, the xylene rubbing test was conducted and estimated, and the contact angle to water was measured as follows:

[Xylene rubbing]

The baked film is rubbed ten times with an absorbent cotton impregnated with xylene and the surface of the film is observed with the naked eye.

○: No damage is observed on the film surface.
X: Scratches are observed on the film surface.

[Contact angle]

The contact angle (°) to water is measured by using a contact angel measuring instrument commercially available from Kyowa Kaimen Kagaku Kabushiki Kaisha.

The results are shown in Table 2.

1. A composition comprising a blend of components (A), (B) and (C), wherein
    (A) is a hydroxyl group-containing acrylic resin which does not contain an alkoxysilyl group,
    (B) is an acrylic copolymer containing an alkoxysilyl group having the formula (I):

wherein $R^1$ is an alkyl group having 1 to 10 carbon atoms, $R^2$ is a hydrogen atom, an alkyl group, an aryl group or an aralkyl group, and a is 0, 1 or 2,
    (C) is a polyorganosiloxane bearing one or more reactive groups selected from the group consisting of a silano group, an alkoxysilyl group, an alcoholic hydroxyl group, a glycidyl group, an amino group, a mercapto group a carboxyl group, an amide group, a vinyl group, an acryloyloxy group and a methacryloyloxy group and further comprising
    (D) a curing catalyst.

2. The composition of claim 1, wherein said resin (A) has a hydroxyl value of 10 to 300 mgKOH/g.

3. The composition of claim 1, wherein said resin (A) has a number average molecular weight of 1,500 to 40,000.

4. The composition of claim 1, wherein said formula (I) is the formula:

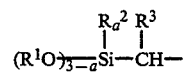

wherein $R^3$ is hydrogen atom, an alkyl group, an aryl

TABLE 2

| Composition | | Ex. 1 | Ex. 2 | Ex. 3 | Ex. 4 | Ex. 5 | Ex. 6 | Com. Ex. 1 | Com. Ex. 2 | Com. Ex. 3 |
|---|---|---|---|---|---|---|---|---|---|---|
| White enamel (I) | | 100 | 100 | 100 | — | — | — | 100 | — | |
| White enamel (II) | | — | — | — | 100 | 100 | 100 | — | 100 | Acryl melamine white enamel*5 |
| Polyorgano- | PS 339.7 *1 | 10.8 | — | — | 1.8 | — | — | — | — | |
| siloxane | PS 340 *2 | — | 7.2 | — | — | 1.8 | — | | | |
| | PS 084 *3 | | | 3.6 | | | 1.8 | | | |
| Curing catalyst | TN 801 *4 | 0.72 | 0.72 | 0.72 | 0.72 | 0.72 | 0.72 | 0.72 | 0.72 | |
| Xylene rubbing | | ○ | ○ | ○ | ○ | ○ | ○ | ○ | ○ | ○ |
| Contact angle (°) | | 100 | 100 | 99 | 102 | 100 | 100 | 80 | 81 | 82 |

(Notes)
*1 Polydimethylsiloxane containing silanol group at the molecular end, commercially available from Chisso Kabushiki Kaisha (molecular weight: 700)
*2 Polydimethylsiloxane containing silanol group at the (molecular end molecular weight: 1700)
*3 Polydimethyldiphenylsiloxane containing diphenyl silanol group at the molecular end (molecular weight: 950)
*4 Dioctyl tin maleate commercially available from Sakai Kagaku Kogyo Kabushiki Kaisha
*5 Acrylic melamine white enamel on the market AS apparent from the results shown in Table 2, the composition containing the polyorganosiloxane can be made large in contact angle to water with keeping excellent the curability, that is, the water repellency can be given to the film.

The composition of the invention can give a film with excellent weatherability, stain resistance, acid resistance, water repellency and durability and with no bad-smelling odor.

In addition to the ingredients used in the Examples, other ingredients can be used in the Examples as set forth in the specification to obtain substantially the same results.

What we claim is:

group or an aralkyl group and $R^1$, $R^2$ and a are as defined above.

5. The composition of claim 1, wherein said copolymer (B) is a copolymer having 5 to 90% by weight of units of an alkoxysilyl vinyl monomer having a polymerizable unsaturated double bond and an alkoxysilyl group.

6. The composition of claim 1, wherein said polyorganosiloxane (C) is a polyorganosiloxane having a reactive functional group at its one or both ends, or its side chain.

7. The composition of claim 1, wherein said curing catalyst (D) is at least one member selected from the group consisting of an organotin compound, an acid phosphate, a mixture of an acid phosphate and an amine a reaction product of an acid phosphate and an amine, a saturated polyvalent carboxylic acid, an unsaturated polyvalent carboxylic acid, a saturated polyvalent carboxylic acid anhydride, an unsaturated polyvalent carboxylic acid anhydride, an organic titanium compound and an organic aluminum compound.

8. The composition of claim 1, which further comprises a hydrolyzable ester compound as a dehydrating agent and an alkyl alcohol as solvent.

9. The composition of claim 1, which further comprises at least one compound selected from the group consisting of methyl silicate, alkoxy substituted silanes, a condensation product of methylsilicate or an alkoxy substituted silane, a reaction product of a silane coupling agent containing an amino group with a silane coupling agent containing an epoxy group, a reaction product of a silane coupling agent containing an amino group with a compound containing an epoxy group, and a reaction product of a silane coupling agent containing an epoxy group with an amine-containing compound.

10. The composition of claim 1, which further comprises an ultraviolet absorber and a light stabilizer.

11. A composition comprising a blend of components (A), (B) and (C), wherein (A) is a hydroxyl group-containing acrylic resin which does not contain an alkoxysilyl group, (B) is an acrylic copolymer containing an alkoxysilyl group having the formula (I):

wherein $R^1$ is an alkyl group having 1 to 10 carbon atoms, $R^2$ is a hydrogen atom, an alkyl group, an aryl group or an aralkyl group, and a is 0, 1 or 2, (C) is a polyorganosiloxane bearing one or more reactive groups selected from the group consisting of a silanol group, an alkoxysilyl group, an alcoholic hydroxyl group, a glycidyl group, an amino group, a mercapto group, a carboxyl group, an amide group, a vinyl group, an acryloyloxy group and a methacryloyloxy group and further comprising (D) a curing catalyst, wherein said acrylic resin (A) is an acrylic copolymer which contains a hydroxyl group derived from at least one member selected from the group consisting of an acrylic monomer containing a hydroxyl group, a methacrylic monomer containing a hydroxyl group, a polycaprolactone containing an acryloyl group and a polycaprolactone containing a methacryloyl group.

12. The composition of claim 1, wherein the ratio of the component (A) to the component (B) is from 9/1 to 1/9 by weight.

13. The composition of claim 1, wherein the ratio of the component (A) to the component (B) is from 8/2 to 2/8 by weight.

14. The composition of claim 1, wherein said polyorganosiloxane (c) is present in an amount of 0.01 to 100 parts by weight per 100 parts by weight of the total of the components (A) and (B).

* * * * *